United States Patent
Pauwels et al.

(10) Patent No.: US 7,173,901 B2
(45) Date of Patent: Feb. 6, 2007

(54) FLOW AND CONGESTION CONTROL IN A SWITCHING NETWORK

(75) Inventors: Bart Joseph Gerard Pauwels, Tessenderlo (BE); Peter Irma August Barri, Bonheiden (BE)

(73) Assignee: Alcatel, Paris (FR)

( * ) Notice: Subject to any disclaimer, the term of this patent is extended or adjusted under 35 U.S.C. 154(b) by 1163 days.

(21) Appl. No.: 10/152,283

(22) Filed: May 22, 2002

(65) Prior Publication Data

US 2002/0191542 A1    Dec. 19, 2002

(30) Foreign Application Priority Data

Jun. 18, 2001    (EP)    ................................. 01401593

(51) Int. Cl.
*H04J 1/16*    (2006.01)
(52) U.S. Cl. ........................ 370/218; 370/228; 370/230
(58) Field of Classification Search ....................... None
See application file for complete search history.

(56) References Cited

U.S. PATENT DOCUMENTS

| 6,094,435 | A | 7/2000 | Hoffman et al. |
| 6,108,307 | A | 8/2000 | McConnell et al. |
| 6,298,061 | B1 * | 10/2001 | Chin et al. .................... 370/400 |
| 6,608,813 | B1 * | 8/2003 | Chiussi et al. ............... 370/218 |
| 6,721,273 | B1 * | 4/2004 | Lyon ........................... 370/235 |
| 6,925,054 | B1 * | 8/2005 | Atterton et al. .............. 370/218 |
| 6,999,415 | B2 * | 2/2006 | Luijten et al. ............... 370/230 |

FOREIGN PATENT DOCUMENTS

| WO | WO 00/56023 | 9/2000 |
| WO | WO 01/31860 A1 | 5/2001 |

* cited by examiner

*Primary Examiner*—Andrew C. Lee
(74) *Attorney, Agent, or Firm*—Sughrue Mion, PLLC

(57) ABSTRACT

System for obtaining an efficient and scaleable flow control in a large packet switched network including ingress termination boards (B1") linked to egress termination boards (B4") by means of virtual ingress to egress flow control links through a switch core.

The flow control transmission link between a port of an ingress termination board and a port of an egress termination board comprises at least two virtual ingress to egress flow controlled traffic pipes (VIEP"a, VIEP"b), one pipe handling all the traffic between the two ports which is going towards communication channels for which no congestion is detected at the level of the egress termination board, the other pipe handling all the traffic going towards communication channels for which congestion is detected.

9 Claims, 4 Drawing Sheets

Port/channel congestion information updated by flow control

FLOW AND CONGESTION CONTROL IN A SWITCHING NETWORK

The invention relates to a system for flow control in a switching network, particularly in a packet switched network, having a switch core and including ingress termination boards linked to egress termination boards by means of respective virtual ingress to egress flow control pipes and via respective ingress or egress switching network ports.

Each port corresponds to an interface between a termination board, or blade, and the switch core, and is linked to communication channels inside its respective termination board. Each communication channel corresponds to an external interface, at a logical or physical level, for a termination board.

This corresponds to the arrangement indicated in the preamble of claim 1.

Existing packet switched networks, used in equipment that deals with non-guaranteed packet communication, require a form of end-to-end flow control.

This flow control can be implemented in a central scheduler which matches input requests to output opportunities or by means of a backpressure signal per destination. It can also be implemented by a distributed bandwidth request-granting mechanism, or other.

A flow control can be exerted at various levels of traffic aggregation in the switching network from the lowest level, i.e. per individual packet, to per whole egress termination board, which is in practice the highest level chosen in actual implementations. In between are methods per packet flow, i.e. per stream of packets with some common identification, per logical channel, e.g. an ATM VP/VC or a Packet over SDH Virtual Container, or per physical interface, i.e. port, on an egress termination board.

Flow control at a given level makes a traffic stream, identified at this level, insensitive to congestion incurred by other traffic streams at the same level in the same system. By construction, traffic streams identified at higher levels experience the same independence. However, traffic streams identified at a lower level than the level at which flow control is applied, will be impaired by congestion in fellow traffic streams, at the same level, if they pertain to a same group controlled by the single flow control instance at the higher level.

This is due to the fact that all lower level traffic streams compete for the same resources acquired by the same higher level flow control instance for the traffic stream at its level, i.e. for the multitude of traffic streams identifiable at any lower level.

For finest traffic control, and highest efficiency, flow control at the lowest levels of identifiable traffic streams is best. Because of this, in known networks, internal flow control works at channel level, for a limited number of termination boards, or blades, having a limited number of channels. Impairment of traffic flowing to a non congested port on a board, by other traffic flowing to a congested port on the same board, is avoided with the internal flow control indicated above and such a condition is highly appreciated by users of such equipment.

In present networks, flow control usually implies the installation of one virtual ingress-egress pipe VIEP pipe at the level of a flow, which has to be controlled independently in order to be free of any congestion occurring for other flows at the same level.

However, for large networks a channel based flow control does not scale, or only with great difficulty. For scalability, it is advantageous to apply flow control not at the lowest levels of traffic streams, but at the highest levels, i.e. at termination board level. However, this creates the risk of having a traffic starvation of non-congested traffic, towards an egress channel of a termination board, which is induced by a congestion of traffic, towards another channel of the same board.

In a network, as shown on FIG. 1, including ingress termination boards point to point linked to egress termination boards at the level of their respective ports for end-to-end traffic flowing through VIEP pipes, such as VIEP1 to VIEP3, through a switch core fabric SC, a risk as stated above will happen, for instance, if there are simultaneously:
- an ingress termination board B1 with a port P1 requiring a one erlang traffic to a channel C1 of an egress termination board B4,
- an ingress termination board B2 with a port P1 requiring a one erlang traffic to channel C1 of egress termination board B4,
- an ingress termination board B3 with a port P2 requiring a one-erlang traffic to channel C2 of egress termination board B4.

It is also supposed that egress termination board B4 cannot receive more than two erlangs at the ES reference point, these two erlangs corresponding to the sum of the needed bandwidths for channel C1 and channel C2, and there are requests from the ingress termination boards for three erlangs. The available bandwidth is distributed in proportion and the internal flow control will grant ⅔ of the requested traffic in fair share to every ingress termination board. There is a request of two erlangs at port P1 of egress termination board 4, and internal flow control traffic will grant ⁴⁄₃. So ⅓ of the traffic sent to P1 of egress termination board 4 will be discarded as there is only one erlang available at channel C1 level.

A request for an one erlang traffic is related to channel C2 of egress termination board 4, but the internal flow control will grant only ⅔ and channel C2 of egress termination board 4 will be underloaded as it will receive only a traffic corresponding to ⅔ of an erlang. Accordingly the chosen distribution rules are not truly satisfactory as, on the one hand, a part of traffic to channel C1 of egress termination board 4 is discarded at the egress side and, on the other hand, channel C2 of the same egress termination board is underloaded.

To avoid this in a traditional manner, the management of the available bandwidth by internal flow control mechanisms in broadband switching networks needs to be provided for a huge number of ports and channels in relation with the very large capacity requested now and particularly with the growing number of line termination boards and of physical or logical communication channels linked to the ports at the level of the termination boards, in large networks. Internal flow control at channel level for a large number of termination boards, does not fit well anymore, as it involves too heavy workloads in processing and control data transmission. As internal flow control at channel level does not scale it is not convenient and is in fact only well adapted for relatively small switching networks with a limited number of ports.

An object of the invention, therefore, is to provide a system for obtaining an efficient and scaleable flow control in a large switching network and particularly in a packet switched network which is fit for Internet protocol IP and/or multiprotocol label switching MPLS.

The switching network includes a switch core and it also includes ingress termination boards linked to egress termination boards by means of respective virtual ingress to egress flow control pipes and via respective ingress or egress switching network ports.

Each switching network port corresponds to an interface between a termination board and the switch core and is linked to communication channels in the said termination board. Each communication channel corresponds to an external, physical or logical, interface for a termination board.

According to the invention, to at least one first virtual ingress to egress flow control pipe, between a determined switching network port of an ingress termination board and a determined switching network port of an egress termination board, is associated at least another virtual ingress to egress flow control pipe. Said at least one first virtual ingress to egress flow control pipe handles all the traffic, between the two switching network ports, which is going towards communication channels for which no congestion is detected at the level of the egress termination board. Said at least one other virtual ingress to egress flow control pipe handles all the traffic, between the two switching network ports, towards communication channels for which congestion is detected at the level of the egress termination board and as long as such a congestion is detected.

So such a flow control system requires less resources than a flow control system in which each channel has its own ingress to egress flow control pipe.

According to the invention, the flow control system comprises a flow control function including means for detecting and checking congestion of communication channels at the level of egress termination boards and means for redirecting traffic between virtual ingress to egress flow control pipes at the level of ingress termination boards according to channel congestion information transmitted from every egress termination board to all the ingress termination boards with which it is linked by means of virtual ingress to egress flow control pipes.

According to the invention, the flow control system comprises a flow control function including means for insuring a reallocation of flow queues from means for controlling flows for a virtual ingress to egress flow control pipe to means for controlling flows for another virtual ingress to egress flow control pipe, to avoid traffic packet disordering due to traffic shift from a first pipe to a said another pipe or vice-versa and maintain cell sequence integrity.

According to the invention, a flow control pipe between a port of an ingress termination board and a port of an egress termination board is associated to another virtual ingress to egress flow controlled traffic pipe, one pipe handling all the traffic between the port of the ingress termination board and the channels of the egress termination board as long as there is no congestion detected at the level of the channel at the egress termination board, the other pipe handling traffic regulated between the port of the ingress termination board and the channels of the egress termination board, as soon and as long as congestion is detected at the level of the channels of the egress termination board.

In an embodiment of the system, according to the invention, there is a distributed flow queue identification function receiving flow queue identifications, for the queues associated to the two pipes linking all ports of an ingress board to a port of an egress board, and providing these identifications either unchanged or converted, according to non-congestion or congestion statuses negotiated at the ingress level from non-congestion or congestion information provided for at the level of the channels of the egress board, to have the packets transmitted either by the first pipe which is reserved for non-congested traffic or by the second pipe which handles congested traffic.

According to an embodiment of the invention, the flow control system comprises at least one virtual ingress to egress flow control pipe, linking a switching network port of an ingress termination board and a network switching port of an egress termination board and handling all the traffic going towards communication channels for which no congestion is detected at the level of the egress termination board, and respectively m−1 virtual ingress to egress flow control pipe(s) handling all traffic going towards respectively up to m−1 communication channels for which a congestion is detected at the level of the egress termination board and as long as the congestion remains detected, m being the number of virtual ingress to egress flow control pipe per egress port.

Another object of this invention is to provide a packet switched communication network comprising flow control system as defined above.

These and other objects, advantages and features of the invention will become apparent from the following description thereof taken in conjunction with the accompanying drawings below listed.

The invention relates to a system for flow control for a large switching network and particularly for a packet switched communication network including means for allocating bandwidth between ports of ingress and egress termination boards and supporting transfer of excess traffic, the excess bandwidth being distributed by internal flow control mechanisms.

It relates more specifically to broadband networks, providing different service categories that relate traffic characteristics and quality of service QoS to network behavior. Service classes in such networks divide the traffic between first served "guaranteed traffic" and last served "best effort traffic", the latter receiving the bandwidth which is not preempted by guaranteed traffic. Multiple classes may exist between "guaranteed traffic" and "best effort traffic".

Figure 1:
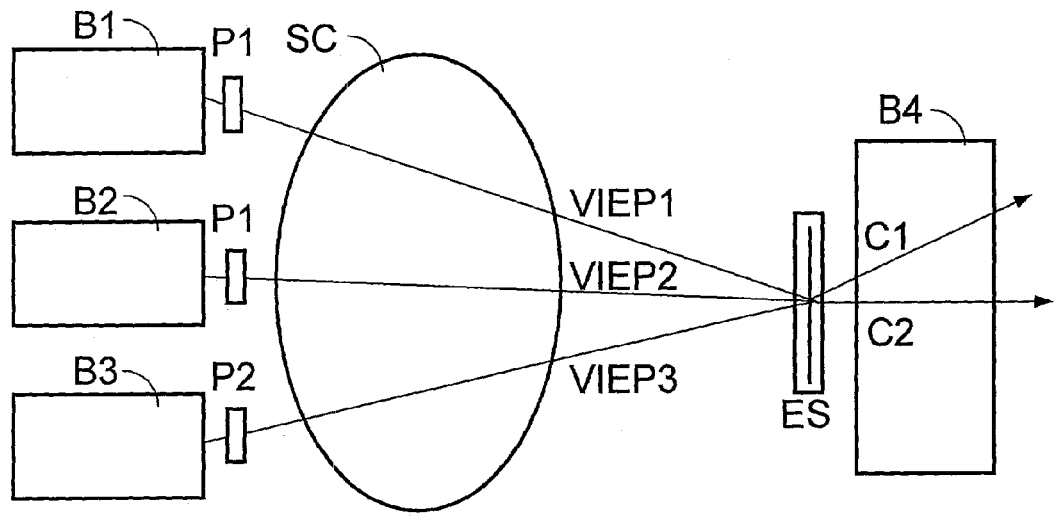
FIG. 1 illustrates a prior art traffic distribution situation.
Figure 2:
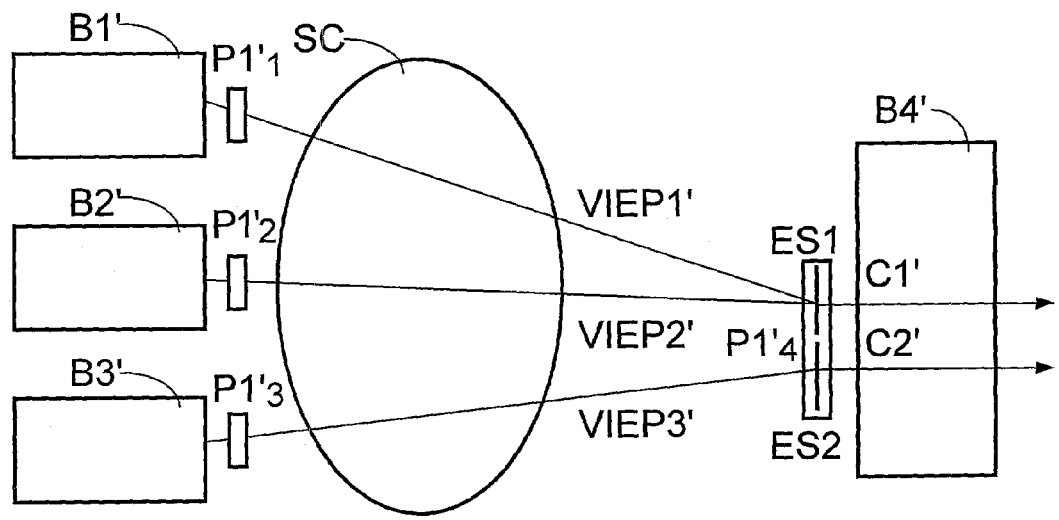
FIG. 2 illustrates a traffic distribution according to the invention.

The traffic distribution, schematically illustrated on FIG. 2, corresponds to a distribution related to a packet switched communication network as defined above. This network comprises ingress termination boards, such as B1', B2', B3' point-to-point linked to egress termination boards, such as B4' by means of flow control links corresponding each to a virtual ingress-to-egress pipe, such as V1EP1', VIEP2' and VIEP3'. An ingress termination board such as B1' is linked by a port $P1'_1$ to an egress termination board such as B4', via a port $P1'_4$ of this egress board and by means of a flow control transmission link, such as VIEP1'. As known, a port, such as $P1'_4$, of an egress termination board corresponds to one or more communication channels and accordingly to one or more physical or logical ports of the termination, such physical port being for instance optical or electrical ports and such logical port being for instance a packet over Sonnet POS channel. It is provided two egress switch Interfaces ES1 and ES2 instead of one at the port level of an egress termination board, such as $P1'_4$ for board B4', in order to separate non-congested traffic from congested traffic. So, there is no more risk of traffic starvation of non-congested traffic by congested traffic.

If ingress termination boards B1' and B2' ask for a one erlang traffic to channel C1' of egress termination board B4', the available bandwidth will be fairly distributed between the two, without any action on the one erlang traffic to channel C2' of egress termination board which is requested by ingress termination board B3'.

The available bandwidth at ES1 and ES2 reference point is adapted according the egress channels served.

Figure 3:
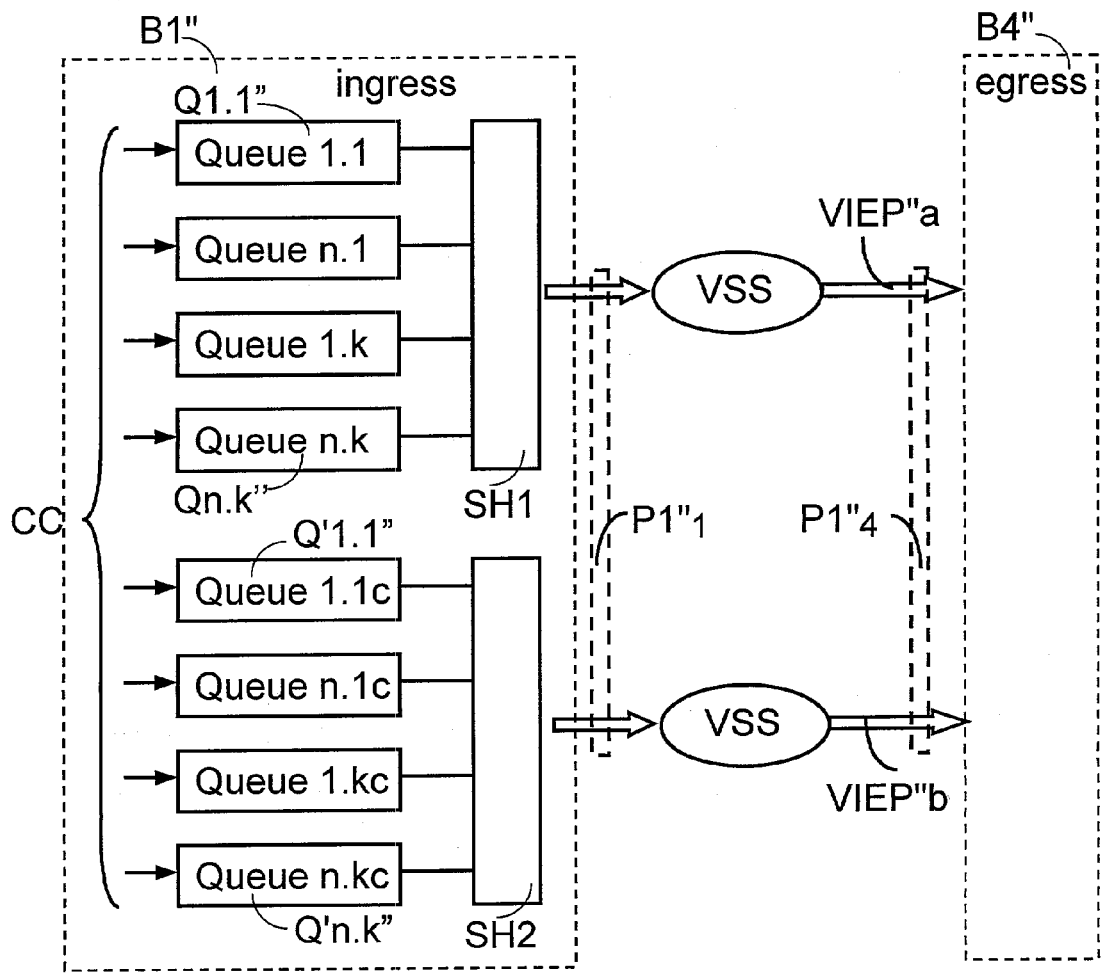
FIG. 3 illustrates queue ingress topology as provided for in a flow and congestion control system according to the invention.

According to the invention, such a distribution is obtainable with an arrangement as illustrated on FIG. 3, such an arrangement being related to a pair of termination boards including an ingress termination board B1" and an egress termination board B4" with a flow controlled path including two virtual ingress-to-egress flow controlled traffic pipes referenced VIEP"a and VIEP"b.

As already known, the resources corresponding to the available bandwidth on the links between ingress termination boards and egress termination boards are allocated in a fixed manner for traffic streams to be provided with a guaranteed bandwidth, and by an internal flow control function for the allocation of the available internal excess bandwidth to other traffic streams, according to their priority or weight.

An example of traffic with guaranteed bandwidth is for instance Internet Protocol IP traffic according to the expedited forwarding EF differentiated services class or diffserv. An example of traffic for which the remaining bandwidth is available is for instance Internet Protocol IP traffic, according to the assured forwarding AF differentiated services class diffserv, or IP best effort class traffic. As shown on FIG. 3, specific queues are allocated to every differentiated service class at the input level of the two pipes VIEP'a and VIEP'b, with for instance diffserv class 1 traffic to channel 1 of egress termination board B4' transiting by queue Q.1.1" and diffserv class n to channel k of the same egress termination board transiting by queue Q.n.k", as regard traffic handled by pipe VIEP"a under of a scheduler, such as SH1. According to the invention, first pipe VIEP"a will solely handle non-congested traffic, second pipe VIEP"b handling congested traffic, as soon and as long as congestion is detected at the level of the port, such as $P1"_4$, of the egress termination board B4" to which both pipes are linked.

Channel congestion of an egress port is for instance detected by checking the egress queue occupation per channel. Egress channel congestion is supposed to be slowly varying in relation with the speed of the internal flow control, and a time hysteresis is applied as a low pass filter to increase and decrease queue occupation levels, the condition "congested" being set or reset for instance with intervals of several minutes.

Transfer via a second pipe VIEP"b between an ingress termination board and an egress termination board, when there is congestion at the level of the egress channel, relates to best effort traffic. The guaranteed traffic is kept in the first pipe VIEP"a linking the two boards. There is accordingly a full separation between congested and non-congested traffic between the two terminations and no risk of starvation of non-congested traffic by congested traffic. All the ingress termination boards linked to a same egress termination board receive information from an internal flow control function of this last board relating to the level of channel congestion monitored and they start regulating traffic to the congested port using their respective second pipes VIEP"b. Channel congestion status is communicated by an output termination function of an egress termination board to the input termination function of all the ingress termination boards with which it is linked. The redirection of traffic, from non-congested pipe VIEP"a to congested pipe VIEP"b of a same ingress termination board, is triggered at the level of the output port, such as $P1"_4$, to which the two pipes are linked at the ingress level. So if there is a need for discarding traffic due to congestion, it will now happen at the ingress side and not at the egress side, without having switch bandwidth inefficiently used.

Figure 4:
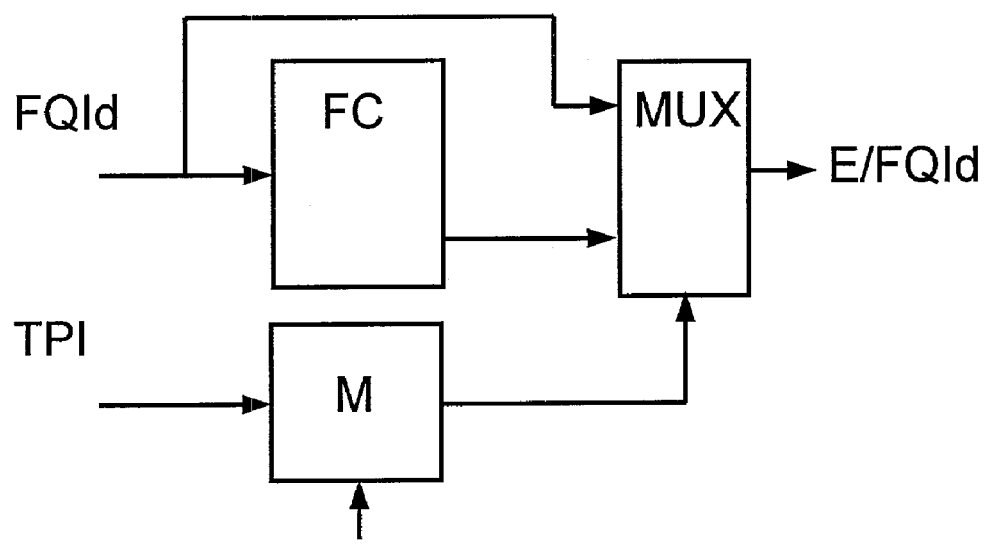
FIG. 4 illustrates an implementation of a switchover from one pipe to another for a control and congestion system as shown on FIG. 3.

FIG. 4 illustrates an example of hardware support for the ingress side of a flow and control congestion system according to the invention. Packet control function provides for flow queue identification FQId and termination board port/channel identification TPI for each pair of associated non-congested and congested pipes, such as VIEP"a and VIEP"b on FIG. 3. Target port and congestion information is stored in a memory of termination board/port congestion M. This memory is updated by the flow control function at the ingress side based on information obtained from the egress side.

Flow queue identifications FQI are used as provided for by the packet control function or after translation by means of a flow queue identification converter FC, a choice being made among them according to the congestion conditions. Queues with fully guaranteed bandwidth are not converted and their flow queue identifications are used as they are.

A multiplexer MUX receives flow queue identifications FQI in relation with packets to be transmitted by means of a pair of pipes and congestion status from congestion memory M for each flow queue related to a port of an ingress board. It provides the effective flow queue identifications for every flow queue from either the packet control function or the flow queue identification converter FC, according to the congestion status for the port of the ingress termination board.

Accordingly, traffic associated to a queue, such as for instance Q1.1" or Q'1.1", to be sent by means of a pipe, VIEP"a or VIEP"b, can be diverted to the corresponding queue Q'1.1" or Q1.1" to be sent by the other pipe according to congestion conditions, the diversion from pipe VIEP"a to pipe VIEP"b occurring when there is congestion and from VIEP"b to VIEP"a when congestion has disappeared.

During the redirection of traffic as indicated above, a temporary disordering of packets might occur. This error will be limited as the diversion of traffic is assumed infrequent due to the applied time hysteresis. However, avoidance of traffic packet disordering when happens a shift of traffic from one pipe to the other is highly recommended as otherwise the information relating to the congestion, as sent from the egress side to the ingress side, will be temporarily wrong and could induce unjustified operations. According to the invention, the diversion is done by the reassignment of queues, e.g. Q1.1" to Q1.k", from the scheduler SH1 associated to VIEP"a on FIG. 3 to scheduler SH2 associated to VIEP"b, or the reverse, with queue Q1.1c to Qn.kc not instantiated any more.

Figure 5:
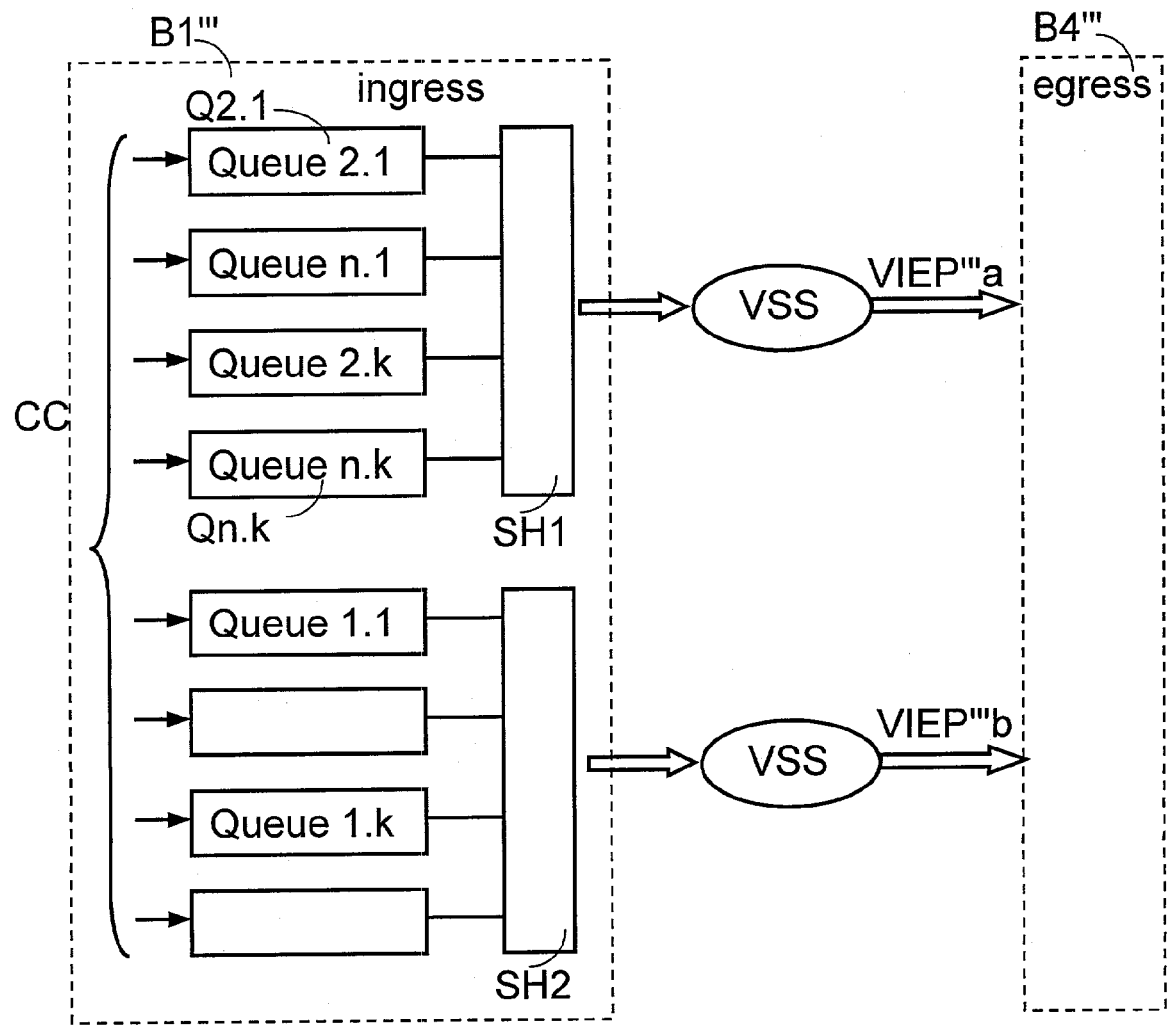
FIG. 5 illustrates queue ingress topology as provided for in a flow and congestion control system according to the invention and respecting traffic packet sequence integrity.

As shown in relation with FIG. 5, the reassignment is done without losing traffic in the queues. A marking is associated with every packet enqueued, for instance in a queue such as queue Qn, in function of the pipe VIEP"'a or VIEP"'b to which the queue is assigned at enqueue time. When a packet is scheduled later by SH1 or SH2, the marking may be used to identify the per VIEP queue filling level counters to be decreased.

If a queue is attached to the scheduler corresponding to VIEP'''a. The frame tag is at that moment set for instance to "1". All frames entering the queue get the tag "1" and the VIEP'''a buffer occupancy is increased with the frame length.

To relocate the queue to the scheduler corresponding to VIEP'''b, a dedicated scheduler command is launched with the following effects:
- new enqueued frames get a tag "0" and the respective queue filling level of VIEP'''b is increased with the frame length for each of these frames;
- the queue is relocated to the scheduler corresponding to VIEP'''b.

If a frame is serviced and the tag is 1 assigned to VIEP'''a, for instance by scheduler SH1, a VIEP'''a queue filling level counter is decreased. If a cell with tag 0 is served either by scheduler SH1 or by scheduler SH2, queues filling level counter of VIEP'''b is decreased.

As soon as the queue has to be relocated, the above algorithm is repeated with inverted tag values.

The above principle of two VIEP pipes per egress port can be extended to multiple VIEP pipes per egress port.

Assuming first that:
n is the number of channels per termination board,
m is the number of VIEP pipes per egress port,
m is smaller than n, If only m−1 channels are possibly congested simultaneously and the flow controlled transfer of traffic between a port of an ingress termination board and a port of an egress termination board comprises m individually flow controlled virtual ingress to egress traffic pipes, one pipe handles all the traffic between the two ports which is going towards channels for which no congestion is detected at the level of the egress termination board. The other m−1 pipes handle the traffic that is going towards the congested channels, as long as congestion is detected at the level of the egress termination board.

If there is a possibility of having more than m−1 channels congested simultaneously, there is a necessity of having another arrangement.

The flow controlled transfer of traffic between a port of an ingress termination board and a port of an egress termination board comprises m individually flow controlled virtual ingress to egress traffic pipes. One pipe handles all the traffic between the two ports which is going towards channels for which no congestion is detected at the level of the egress termination board. The last pipe m handles all remaining traffic which is going towards congested egress channels not handled by pipes 2 to m−1 and as long as congestion is detected at the level of the egress termination board for these channels.

The invention claimed is:

1. System for flow control in a switching network packet, particularly in a packet switched network, having a switch core and including ingress termination boards linked to egress termination boards, by means of respective virtual ingress to egress flow control pipe and via respectively ingress or egress switching network ports, each switching network port corresponding to an interface between a termination board and the switch core and being linked to communication channels in this termination board, each communication channel corresponding to an external interface for a termination board, characterized in that to at least one respective virtual ingress to egress flow control pipe (VIEPa") between a determined switching network port ($P1''_1$) of an ingress termination board (B1") and a determined switching network port ($P1''_4$) of an egress termination board (B4"), is at least associated one other virtual ingress to egress flow control pipe (VIEPb"), said at least one first virtual ingress to egress flow control pipe handling all the traffic, between the two switching network ports, which is going towards communication channels for which there is no congestion detected at the level of the egress termination board, the said other at least one other virtual ingress to egress pipe handling all traffic, between the two switching network ports, which is going towards communication channels for which congestion is detected at the level of the egress termination board and as long as such a congestion is detected.

2. System according to claim 1, characterized in that it comprises a flow control function including means for detecting and checking congestion of communication channels at the level of egress termination boards and means for redirecting traffic between virtual ingress to egress flow control pipes at the level of ingress termination boards according to channel congestion information transmitted from every egress termination board to all the ingress termination boards with which it is linked by means of virtual ingress to egress flow control pipes.

3. System according to claim 2, characterized in that said flow control function further includes means for insuring a reallocation of flow queues from means for controlling flows (SH1) for a virtual ingress to egress flow control pipe to means for controlling flows (SH2) for another virtual ingress to egress flow control pipe, to avoid traffic packet disordering due to traffic shift from a first pipe to a said another pipe or vice-versa and maintain cell sequence integrity.

4. System according to claim 1, characterized in that it comprises a distributed flow queue identification function (FC, M, MUX) receiving flow queue identifications, for the queues associated to two virtual ingress to egress flow control pipes (VTEP"a, VIEP"b) linking a port (P1") of an ingress board (B1") to a port (P1"4) of an egress board (B4"), and providing these identifications either unchanged or modified according to non-congestion or congestion statuses computed at the ingress level from non-congestion or congestion information established at the level of the egress board, to have the packets transmitted either by first virtual ingress to egress flow control pipe (VIEP"a) which is reserved for non-congested traffic or by second virtual ingress to egress flow control pipe (VIEP"b) reserved for congested traffic.

5. System according to claim 4, characterized in that it comprises means providing flow queue identification (MUX) for identifying the queue to which a packet has to be forwarded, said queue identification being obtained according to congestion status for a port of an ingress termination board from congestion memory means (M) located at ingress side on the basis of information obtained from egress side, said memory means being updated by means of the system flow control function.

6. System according to claim 3, characterized in that it comprises packet marking means at the ingress side for differentiating the packets enqueued when the queue is attached to a non-congested virtual ingress to egress flow control pipe (VIEP"a) or when the queue is attached to a congested virtual ingress to egress flow control pipe (VIEP"b) in order to facilitate per VIEP accounting.

7. System according to claim 1, characterized in that it comprises at least one virtual ingress to egress flow control pipe (VIEP'''a), linking a switching network port of an ingress termination board and a network switching port of an egress termination board and handling all the traffic going towards communication channels for which no congestion is detected at the level of the egress termination board, and respectively m−1 virtual ingress to egress flow control pipes (VIEP'''b) handling all traffic going towards up to m−1 communication channels for which a congestion is detected at the level of the egress termination board and as long as the congestion remains detected, m being the number of virtual ingress to egress flow control pipe per egress port.

8. System according to claim 1, characterized in that it comprises at least one virtual ingress to egress flow control pipe (VIEP'''a), linking a switching network port of an ingress termination board and a network switching port of an egress termination board and handling all the traffic going towards communication channels for which no congestion is detected at the level of the egress termination board, and respectively m−2 virtual ingress to egress flow control pipes (VIEP'''b) handling all traffic going towards up to m−2 communication channels for which a congestion is detected at the level of the egress termination board and as long the congestion remains detected, m being the number of virtual ingress to egress flow control pipes per egress port, and whereby the last pipe (in) handles all the remaining traffic which is going towards congested channels not handled by pipes 2 to m−1 and as long as congestion is detected at the level of the egress termination board.

9. Packet switched communication network including ingress termination boards (B1'') linked to egress termination boards (B4''), via respectively ingress or egress termination ports and by means of virtual ingress to egress flow control pipes (VIEP''a, VIEP''b) through a multipath self-routing switch core, and a flow control system, each port being linked to communication channels inside its respective ingress or egress termination board, characterized in that it comprises a flow control system according to at least one of claims 1 to 7.

* * * * *